United States Patent
Cheong et al.

(10) Patent No.: US 6,753,059 B2
(45) Date of Patent: Jun. 22, 2004

(54) OPTICAL RECORDING MATERIAL AND OPTICAL RECORDING MEDIUM USING SAME

(75) Inventors: Byung-ki Cheong, Seoul (KR); Soon-Gwang Kim, Goyang-si (KR); Won-Mok Kim, Seoul (KR); Taek-Sung Lee, Seoul (KR); Sung-Jin Park, Seoul (KR); Tae-Yon Lee, Seoul (KR); Ki-Bum Kim, Seongnam-si (KR)

(73) Assignee: Korea Institute of Science and Technology (KR)

( * ) Notice: Subject to any disclaimer, the term of this patent is extended or adjusted under 35 U.S.C. 154(b) by 42 days.

(21) Appl. No.: 10/138,232

(22) Filed: May 1, 2002

(65) Prior Publication Data

US 2002/0182364 A1 Dec. 5, 2002

Related U.S. Application Data

(63) Continuation-in-part of application No. 10/112,510, filed on Mar. 29, 2002.

(30) Foreign Application Priority Data

Mar. 29, 2001 (KR) .......................................... 2001-16425

(51) Int. Cl.$^7$ ................................................ B32B 3/02
(52) U.S. Cl. .................... 428/64.1; 428/64.4; 428/64.5; 428/64.6; 430/270.13
(58) Field of Search ............................... 428/64.1, 64.4, 428/64.5, 64.6, 913; 430/270.13, 495.1, 945

(56) References Cited

U.S. PATENT DOCUMENTS

| | | | | |
|---|---|---|---|---|
| 5,024,910 A | * | 6/1991 | Ohta | 430/19 |
| 5,254,382 A | * | 10/1993 | Ueno | 428/64 |
| 5,789,055 A | * | 8/1998 | Yoon | 428/64.1 |
| 5,796,708 A | * | 8/1998 | Ohkawa | 369/283 |

* cited by examiner

*Primary Examiner*—Elizabeth Mulvaney
(74) *Attorney, Agent, or Firm*—Anderson Kill & Olick, PC

(57) ABSTRACT

Disclosed in this invention is a phase change optical recording material for a rewritable recording medium with a high speed crystallization and excellent erasability, which comprises a composition having the formula of:

$$(A_aB_bC_c)_x(Ge_aSb_bTe_c)_{1-x}$$

wherein, A is an element selected from the elements belonging to the IVB group in the periodic table; B is an element selected from the elements belonging to the VB group in the periodic table; C is an element selected from the elements belonging to the VIB group in the periodic table; a, b and c are atomic ratios; x is a mole fraction in the range of 0 to 1; and at least one of A, B and C has a higher atomic number and thus a smaller diatomic bond strength than that of the corresponding element in the GeSbTe part.

17 Claims, 7 Drawing Sheets

OPTICAL RECORDING MATERIAL AND OPTICAL RECORDING MEDIUM USING SAME

Continuation-in-Part (CIP) of patent application Ser. No. 10/112,510, filed Mar. 29, 2002.

FIELD OF THE INVENTION

The present invention relates to an optical recording material, and more particularly to an optical recording material applicable to the recording layer of a phase-change type optical recording medium, which comprises a solid solution of a stoichiometric compound GeSbTe alloy and a ternary alloy having essentially the same crystal structure with the same stoichiometry as the GeSbTe alloy.

BACKGROUND OF THE INVENTION

Phase change rewritable optical recording finds its primary applications in rewritable discs of CD (Compact Disc) and DVD (Digital Versatile Disc), two most successful formats of optical discs to date. It is apparent that the phase change technology will uphold future rewritable DVD's with larger storage capacities and furthermore may prove to be a competitive technology for near-field recording media with recording densities well beyond what are accessible with the diffraction limited optics.

A phase-change rewritable optical recording medium makes use of a recording material which is capable of undergoing reversible phase changes between crystalline and amorphous phases under controlled laser beam irradiation. Information is recorded on the recording layer by way of formation of amorphous marks, is erased therefrom by way of crystallization of the amorphous marks and is reproduced from difference in reflectivity between the amorphous marks and the crystalline areas.

Accordingly, a recording material for a phase change rewritable optical recording medium is required to possess the following properties: the difference in reflectivity between its amorphous and crystalline states corresponding respectively to the recorded and erased states of information, should be large; its melting temperature should not be too high or too low; it can easily form an amorphous state by cooling from a liquid state; the amorphous state should be stable during repeated reproductions and at a use condition; and the crystallization kinetics should be sufficiently fast so that the recorded data can be erased within the limited beam dwell time.

Regarding these properties of phase change recording materials, an important problem may be addressed that is encountered in the quest for a recording medium with a higher recording density and data transfer rate. In optical data storage, increase in recording density and data transfer rate is achieved primarily by means of reduction in laser spot size (d) at the recording medium and/or increase in disc linear velocity (v). By either means, however, the dwell time (d/v) of a laser beam becomes diminished; for example, laser dwell time diminishes by a factor of four providing that laser spot size is reduced by half and linear velocity increased two fold.

Such decrease in beam dwell time may render crystallization of the amorphous marks either incomplete or impossible during erasing of the recorded data, leading to a poor erasibility and overwritability of a recording medium. Among the properties required of a phase change optical recording material, a fast crystallization kinetics becomes then critically important. Stoichiometric compound phase change alloys tend to have faster kinetics of amorphous to crystalline transformation and are considered as good candidates to overcome the problem with.

Tellurium (Te)-based materials, stoichiometric compound GeSbTe alloys in particular, have been utilized as phase-change recording materials for rewritable optical data storage. In order to improve the crystallization kinetics of these alloys for use in recording media with higher recording densities and data transfer rates, efforts have been made to date by way of either of two different approaches: use of a single additive element of various kinds or use of crystallization promoting layers.

For example, U.S. Pat. Nos. 5,100,700 and 6,040,066 and published reports by J. H. Coombs et al. [J. Appl. Phys., 78, 4918 (1995)] and by C. M. Lee et al. [J. Appl. Phys., 89, 3290 (2001)] disclose GeSbTe alloys incorporated by a fourth element of either an interstitial or a substitutional type such as O, Sn or Bi.

Further, U.S. Pat. No. 5,965,229, a published work by N. Yamada et al. [Jpn. J. Appl. Phys., 37(4B), 2104 (1998)] and Korean Laid-open Patent Publication Nos. 97-67128 and 98-11179 disclose a recording medium comprising a crystallization-promoting layer of SiN, SiC or GeN respectively disposed between dielectric and recording layers.

It is an objective of this invention to put forth another approach that could be used to improve the crystallization kinetics of and therefore to extend the utility of the stoichiometric compound GeSbTe alloys, in response to a diminishing beam dwell time due to a progressive increase in recording density and data transfer rate of rewritable phase change optical recording media.

SUMMARY OF THE INVENTION

The present invention provides an optical recording material for a rewritable phase-change optical recording medium having high-speed crystallization and excellent erasing properties.

An optical recording material according to the present invention comprises a composition having the formula of:

wherein, A is an element selected from the group IVB of the periodic table; B is an element selected from the group VB of the periodic table; C is an element selected from the group VIB of the periodic table; a, b and c are atomic mole ratios; 0<x<1, x being a mole fraction; and at least one of A, B and C has a higher atomic number, and thus a smaller diatomic bond strengths than that of the corresponding element in the GeSbTe part.

BRIEF DESCRIPTION OF THE DRAWINGS

The above and other objects and features of the present invention will become apparent from the following description thereof, when taken in conjunction with the accompanying drawings wherein.

DETAILED DESCRIPTION OF THE INVENTION

Figure 1:
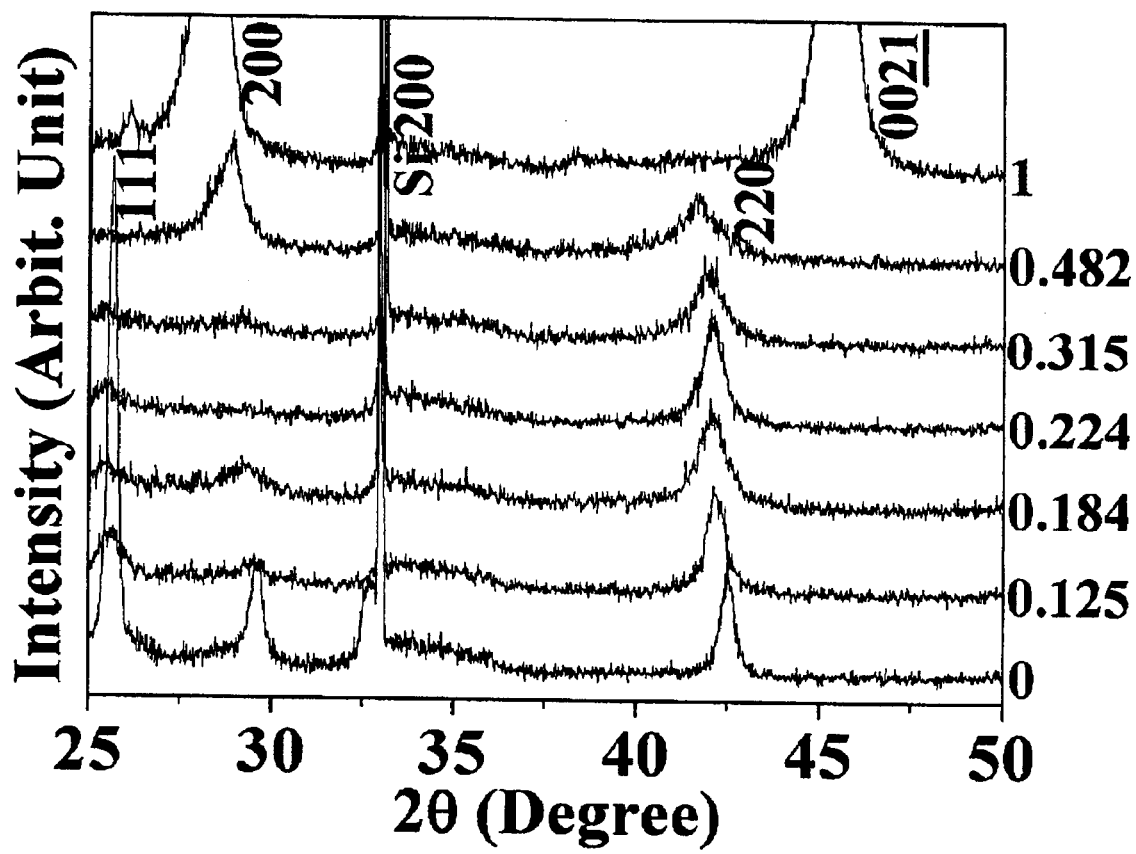
FIG. 1 shows X-ray diffraction spectra of the $(Sn_1Bi_2Te_4)_x(Ge_1Sb_2Te_4)_{1-x}$ films annealed at 150° C. The numbers on the right indicate mole fractions.

Optical recording materials according to the present invention comprise a ternary alloy (i.e., ABC alloy) which forms a homogeneous pseudo-binary solid solution with a GeSbTe alloy.

Specifically, the optical recording materials of the present invention comprise a composition having the following formula:

$$(A_aB_bC_c)_x(Ge_aSb_bTe_c)_{1-x}$$

wherein, A is an element selected from the group IVB of the periodic table; B is an element selected from the group VB of the periodic table; C is an element selected from the group VIB of the periodic table; a, b and c are atomic mole ratios; $1<x<1$, x being a mole fraction; and at least one of A, B and C has a higher atomic number, and thus a smaller diatomic bond strength, than that of the corresponding element in the GeSbTe part.

In one embodiment, the GeSbTe alloy may be a stoichiometric compound alloy of Ge, Sb and Te, preferably selected from the group of $Ge_4Sb_1Te_5$, $Ge_2Sb_2Te_5$, $Ge_1Sb_2Te_4$ and $Ge_1Sb_4Te_7$. Therefore, it is preferable that (a, b, c) is selected from the group consisting of (4, 1, 5), (2, 2, 5), (1, 2, 4) and (1, 4, 7).

In one embodiment, the ABC alloy is a chalcogenide which is stoichiometrically equivalent to the GeSbTe alloy.

A stoichiometric compound alloy tends to have fast kinetics of an amorphous to crystalline transformation for the following reasons: the alloy tends to have a high atomic mobility effected by its large thermodynamic driving force of an amorphous to crystalline transformation; the alloy tends to crystallize into a single phase, requiring only short-range atomic reconfiguration with no need of long-range atomic diffusion indispensable to phase separation. Therefore, it is preferable that the ABC alloy has the same stoichiometric composition as the compound GeSbTe alloy so that an amorphous to crystalline transformation in a solid solution of the ABC and GeSbTe alloys would proceed rapidly likewise.

In addition, A, B and C are elements belonging to the IVB, VB and VIB group in the periodic table, respectively, and the diatomic bond strength of at least one of A, B and C is smaller than that of the corresponding element of the GeSbTe portion. According to the report on GeTe alloys by Y. Maeda and M. Wakagi [Jpn. J. Appl. Phys., 30, 101(1991)], as the amorphous GeTe crystallizes, the Ge—Te bond length increases with disappearance of the Ge—Ge bond. Further, J. H. Coombs, et al. [J. Appl. Phys., 78, 4918(1995)] studied crystallization kinetics of GeSbTe alloys in which a part of Ge is replaced with Sn, or a part of Te is replaced with S or Se. According to these studies, the nucleation kinetics increases when a part of Ge is replaced with Sn whose single bond energy is smaller than that of Ge, whereas the nucleation kinetics decreases when a part of Te is replaced with S or Se whose single bond energy is larger than that of Te.

From these studies, it is apparent that the diatomic bond strength of each constituent element plays an important role in crystallization kinetics. Therefore, in order to increase the crystallization kinetics, it is preferred that at least one of A, B and C has a higher atomic number and thus a smaller diatomic bond strength than that of a corresponding element in the GeSbTe alloy. Thus, A is preferably Sn or Pb, and B is preferably Bi.

Further, it is preferable that the crystal structures of ABC alloy and GeSbTe alloy are essentially the same. When the crystalline phases of both alloys have the same space group symmetry with slightly different lattice parameters, a pseudo-binary solid solution can form with a complete solubility between the two alloys. Table 1 shows a list of the preferable ABC alloys for each of the stoichiometric compound GeSbTe alloys.

TABLE 1

Preferable constituent alloys of the present invention and crystal structure information on the stable equilibrium phase of a respective alloy.

| Compound | Space Group Sym. (Pearson Symbol) | Lattice Parameters (nm) | |
|---|---|---|---|
| $Ge_4Sb_1Te_5$ | Fm-3 m (cF8) | a = 0.6 | |
| [1]$Pb_4Bi_1Te_5$ ($Pb_{39}Bi_9Te_{52}$) | | 0.6415 | |
| [2]$Sn_4Bi_1Te_5$ ($Sn_{38}Bi_{12}Te_{50}$) | | 0.63 | |
| [3]$Pb_4Bi_1Se_5$($Pb_{31}Bi_{15}Se_{54}$) | | 0.605 | |
| $Ge_2Sb_2Te_5$ | P-3 ml (hP9) | a = 0.42 | c = 1.696 |
| $Pb_2Bi_2Te_5$ | | 0.446, | 1.75 |
| $Pb_2Bi_2Se_5$ | | 0.422, | 1.742 |
| $Ge_1Sb_2Te_4$ | R-3 m (hR7) | a = 0.421 | c = 4.06 |
| $Ge_1Bi_2Te_4$ | | 0.428, | 3.92 |
| $Pb_1Bi_2Te_4$ | | 0.416, | 3.92 |
| $Sn_1Bi_2Te_4$ | | 0.4411, | 4.1511 |
| $Sn_1Sb_2Te_4$ | | 0.4294, | 4.1548 |
| $Pb_1Bi_2Se_4$ | | 0.416, | 3.92 |
| $Pb_1Sb_2Se_4$ | | Unknown | |
| $Sn_1Bi_2Se_4$ | | Unknown | |
| $Ge_1Sb_4Se_7$ | P-3 ml (hP12) | a = 0.421 | c = 2.365 |
| $Ge_1Bi_4Te_7$ | | 0.4352, | 2.3925 |
| [4]$Pb_1Bi_4Te_7$ | | 0.446, | 2.36 |
| [5]$Sn_1Bi_4Te_7$($Sn_{12}Bi_{38}Te_{50}$) | | 0.4395, | 2.436 |
| $Pb_1Bi_4Se_7$ | | Unknown | |

Note:
[1]$(Bi_2Te_3)_x(PbTe)_{1-x}$, a = 0.64564–0.64151 nm for x–0–0.1,
[2]$Bi_{1-x}Sn_xTe_1$, a = 0.6300–0.6316 nm for x = 0.75–1,
[3]$(Bi_2Se_3)_x(PbSe)_{1-x}$, a = 0.605–0.605 nm for x = 0–0.2,
[4]three other crystal structures are also known,
[5]$Bi_{1-x}Sn_xTe_1$, a = 0.4448–0.4395 nm, c = 2.427–2.436 nm for x = 0–0.25; $Sn_1Bi_4Te_7$ itself has the symmetry of R-3 m (hR7).

According to the present invention, the atomic mole ratios (a, b, c) may deviate from the aforementioned values to the extent that a solid solution of ABC and GeSbTe alloys can form a single crystalline phase, or multiple phases with a predominant crystalline phase of preferably equal to or more than 90% in volume. In addition, the ABC alloy mole fraction (x) may be adjusted so that a solid solution of ABC and GeSbTe alloys can form a kinetically-arrested metastable amorphous phase by a vapor-quenching or a rapid quenching from its melt state. For example, x is preferably from 0.01 to 0.5.

The present invention is further described and illustrated in Examples, which are, however, not intended to limit the scope of the present invention.

Examples are presented with an experimental alloy system consisting of $Ge_1Sb_2Te_4$ and $Sn_1Bi_2Te_4$ alloys and having the representative composition of $(Sn_1Bi_2Te_4)_x(Ge_1Sb_2Te_4)_{1-x}$.

EXAMPLE 1

$(Sn_1Bi_2Te_4)_x(Ge_1Sb_2Te_4)_{1-x}$ thin films of various x were prepared in a radio frequency (RF) magnetron sputtering system by co-sputtering individual $Ge_1Sb_2Te_4$ and $Sn_1Bi_2Te_4$ targets (Mitsubishi Materials Co., Japan) with varying the sputtering power to the $Ge_1Sb_2Te_4$ target and at a fixed power to the $Sn_1Bi_2Te_4$ target. Thin films of 100 nm thick were formed on Si (001) substrates. From RBS (Rutherford Backscattering Spectrometry) spectra of the sputtered films, elemental compositions of Ge and Bi, yielding clearly separable peaks from the rest, were determined and film compositions were estimated in terms of the mole fraction x assuming that the respective stoichiometry of $Ge_1Sb_2Te_4$ and $Sn_1Bi_2Te_4$ is preserved in the cosputtered films. The sputtered films were annealed at 150° C. and 300° C., respectively in an Ar ambient vacuum furnace for 30 min, and X-ray diffractions were carried out with $Cu-K_\alpha$ radiation for crystal structure analysis.

Figure 2:
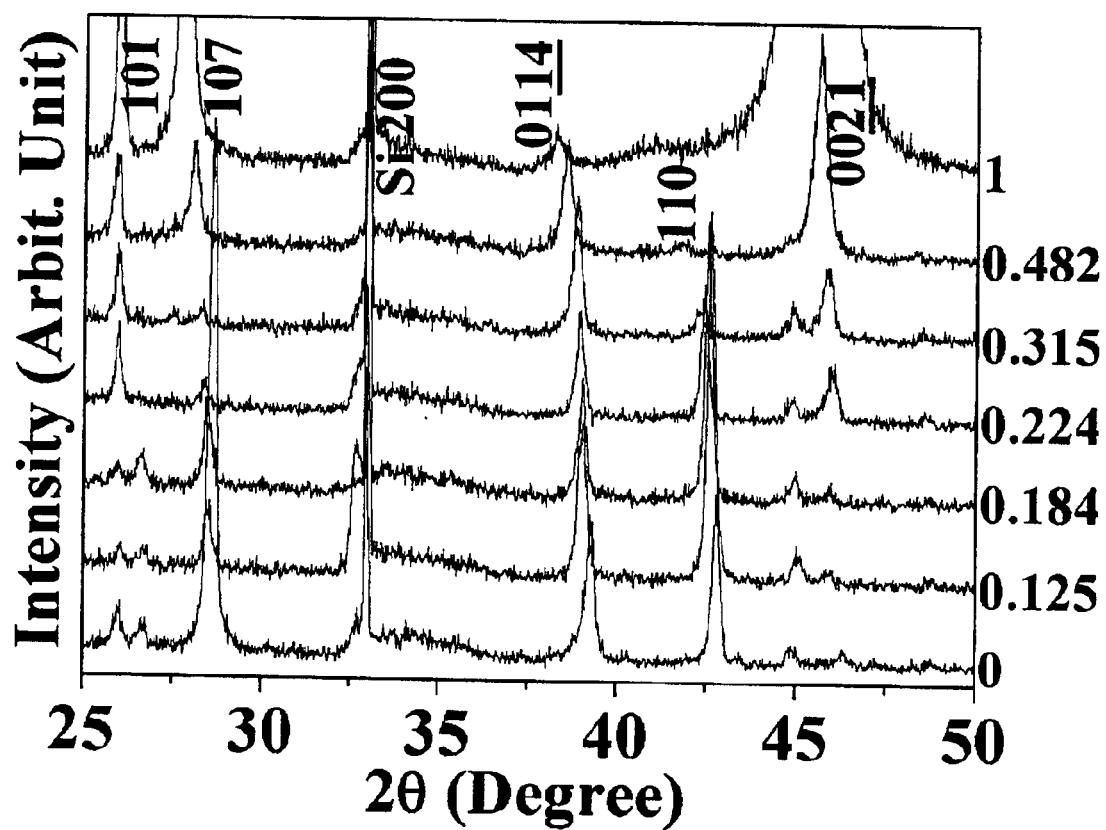
FIG. 2 shows X-ray diffraction spectra of the $(Sn_1Bi_2Te_4)_x(Ge_1Sb_2Te_4)_{1-x}$ films annealed at 300° C. The numbers on the right indicate mole fractions.
Figure 3:
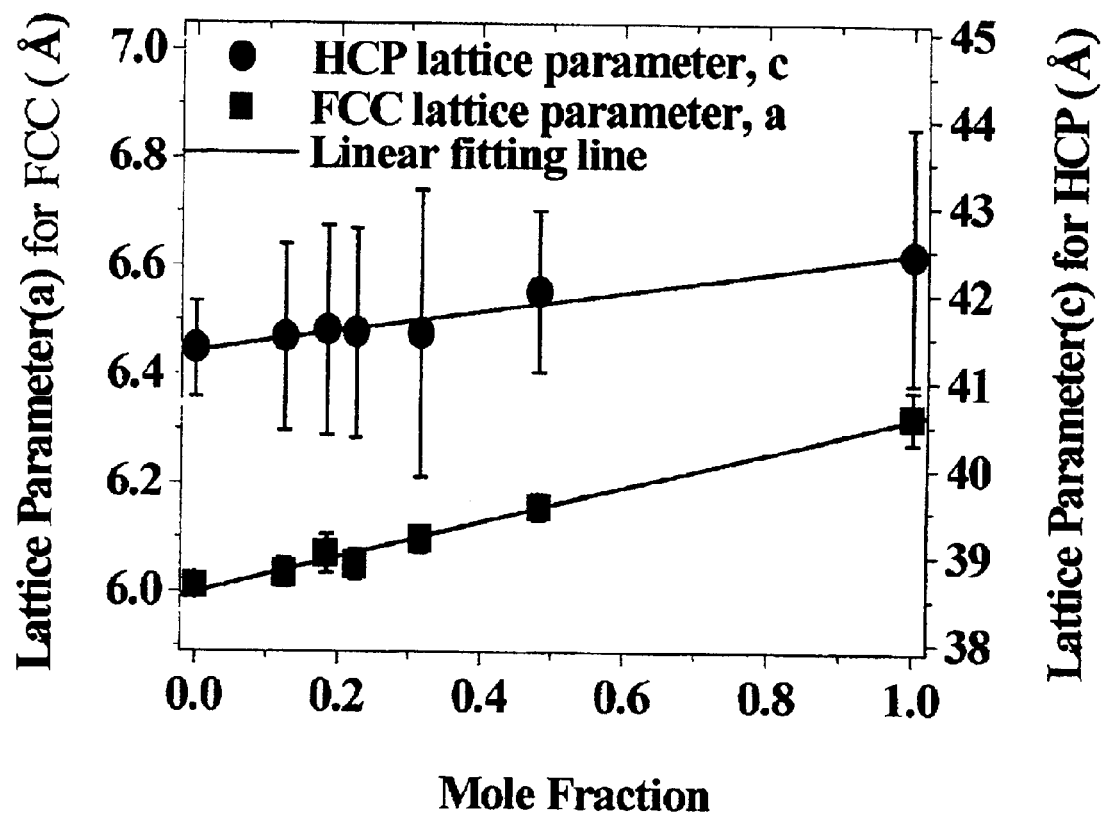
FIG. 3 represents variation of lattice parameters ($a_{FCC}$ and $c_{HCP}$) of the annealed films $(Sn_1Bi_2Te_4)_x(Ge_1Sb_2Te_4)_{1-x}$ with mole fraction.

Shown in FIG. 1 and FIG. 2 are the X-ray diffraction spectra of the co-sputtered films of various compositions (x=0, 0.125, 0.184, 0.224, 0.315, 0.482, 1) annealed at 150° C. and 300° C., respectively. Diffraction spectra in FIG. 1 can be indexed unambiguously as a single Face Centered Cubic (FCC) phase except for the x=1 ($Sn_1Bi_2Te_4$) case, for which indexing accorded with a two phase mixture of an FCC and an Hexagonal Close Packed (HCP) phase. As for the films annealed at 300° C., every diffraction spectra can be indexed according essentially to a single HCP phase. Striking features can be noticed particularly from FIG. 1. With increasing mole fraction, each FCC peak, for instance (220) peak, undergoes a positional shift toward a smaller $2\theta$ angle without peak splitting and it is accompanied by growth in peak width. Both of these results suggest a homogeneous mixing of the two alloys occurred on the atomic scale, attended by lattice distortion due to accommodation of atoms of different sizes. Without homogeneous mixing, (220) peak would have appeared split with $2\theta$ angle separation of more than 2° between $Ge_1Sb_2Te_4$ ($a_{FCC}$=6.01 Å) and $Sn_1Bi_2Te_4$ ($a_{FCC}$=6.33 Å). The dependence of lattice parameters ($a_{FCC}$ and $C_{HCP}$) on the mole fraction is shown in FIG. 3 that was derived from FIG. 1 and FIG. 2 via a least square method. It vividly illustrates linear relationships, so called Vegard's rule, over the entire range of mixing, and therefore confirms that $Ge_1Sb_2Te_4$ and $Sn_1Bi_2Te_4$ constitute a completely soluble pseudo-binary system.

EXAMPLE 2

On a 1.2 mm thick polycarbonate disk substrate having a track pitch of 0.6 μm, a first $ZnS-SiO_2$(8:2) dielectric layer having the thickness of 270 nm was formed using an RF sputtering method. Then, a recording layer having the composition of $(Sn_1Bi_2Te_4)_{0.15}(Ge_1Sb_2Te_4)_{0.85}$ was formed thereon to the thickness of 20 nm. Subsequently, a second $ZnS-SiO_2$ (8:2) dielectric layer having the thickness of 20 nm and an Al—Cr reflection layer having the thickness of 100 nm were sequentially formed thereon by RF sputtering, to obtain a 4-layered phase-change optical recording disc.

Comparative Example 2

Figure 4:
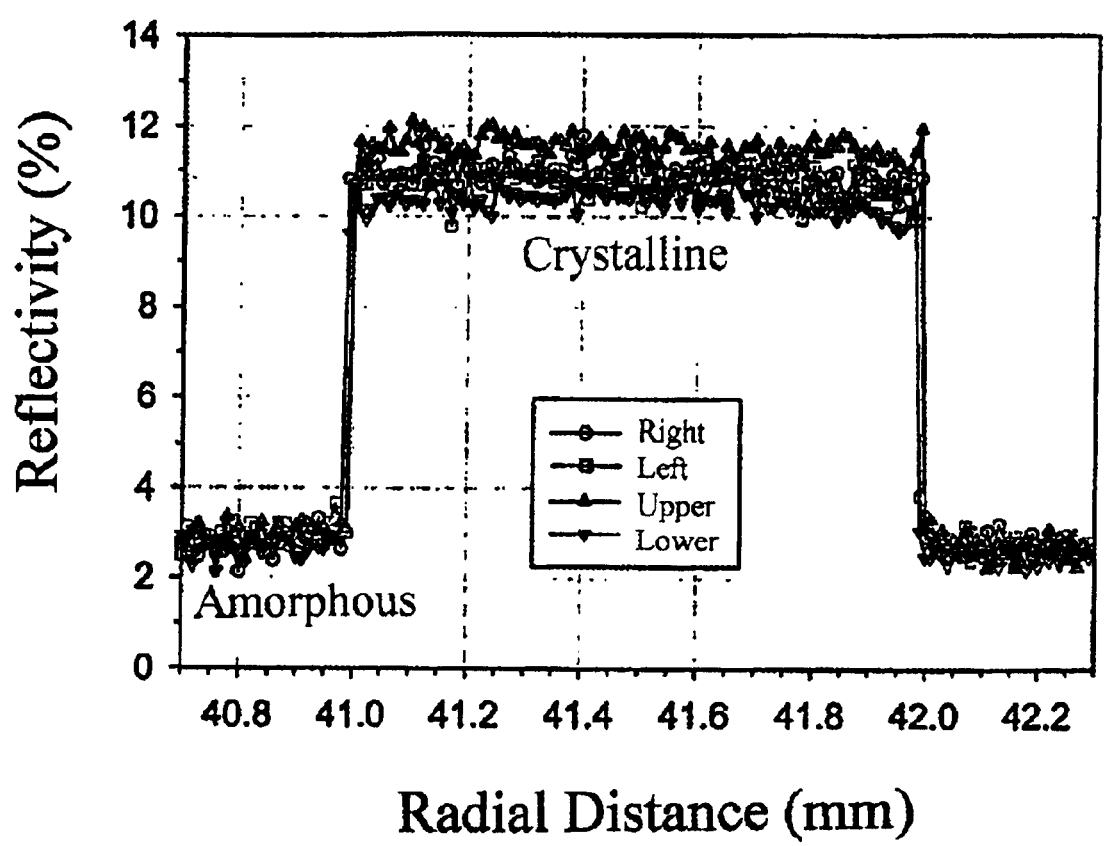
FIGS. 4 and 5 respectively depict the reflectivities of the amorphous and crystalline regions in the discs prepared in Comparative Example 2 and Example 2.
Figure 5:
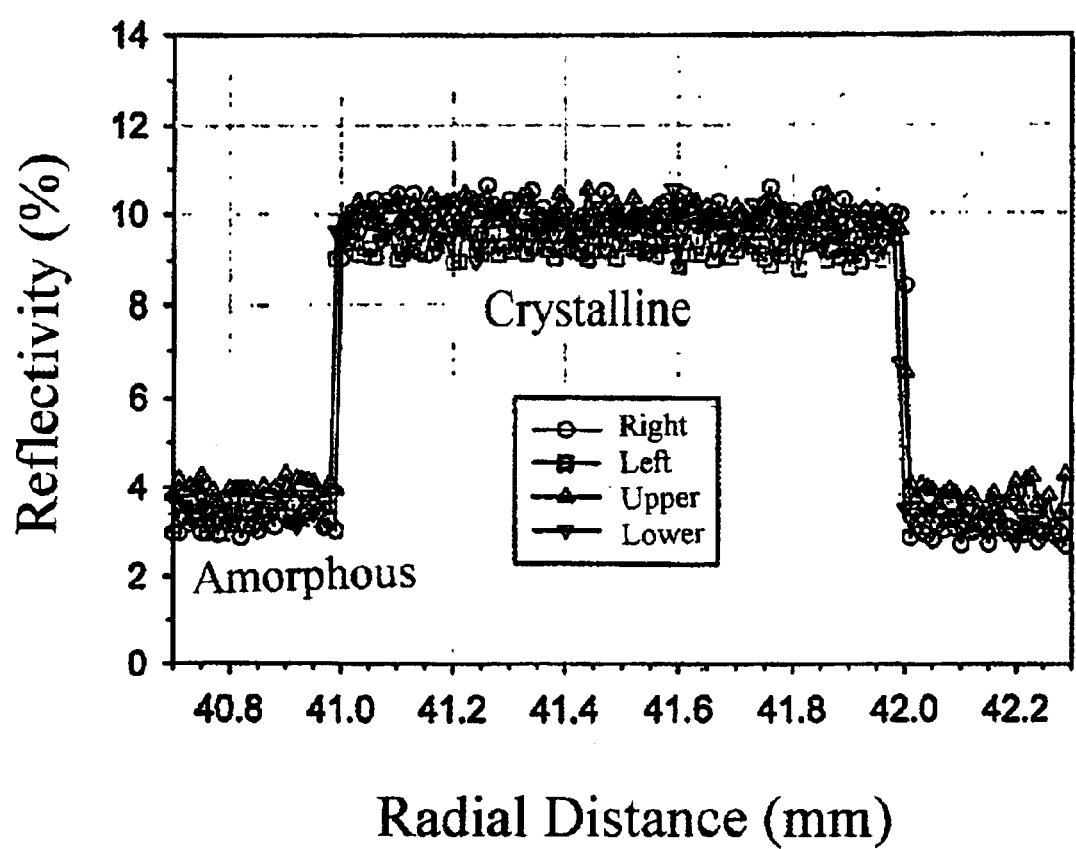

The procedure of Example 2 was repeated except that the composition of the recording layer was $Ge_1Sb_2Te_4$.
Reflectivity Reflectivities of the optical recording discs of Comparative Example 2 and Example 2, were measured by means of a laboratory-built static/dynamic testbed [M. Mansuripur et al., Appl. Opt., 36, 9296 (1997)] equipped with a laser diode of 650 nm in wavelength and an objective lens of a numerical aperture 0.6, and the results are shown in FIGS. 4 and 5, respectively. The reflectivities were measured during laser scanning over a specific range of radius along four different directions 90° apart, i.e., right, left, upper and lower.

In FIG. 4 or 5, the central portion showing high reflectivities corresponds to a region crystallized by laser heating before measurement, and the peripheral portions showing low reflectivities correspond to as-sputtered amorphous regions. The reflectivities of the amorphous state ($R_a$) and the crystalline state ($R_x$) are about 3% and 11%, respectively, for the disc of Comparative Example 2, and about 3.5% and 10%, respectively, for the disc of Example 2. Thus, the optical constants of the amorphous and crystalline phases of the recording layers of Example 2 and Comparative Example 2 are similar to each other.
Recording Properties Recording properties of the discs prepared in Example 2 and Comparative Example 2 were evaluated with the aforementioned disc testbed. Recording was performed at the linear velocity of 9 m/s by use of the recording pattern of 3 Tw (Timing Window(Tw)=23.3 nsec) duration at a varying recording power level followed by 7 Tw duration at a readout (reproducing) power (1 mW) level. The carrier to noise ratio (CNR) was measured at the readout frequency of 4.29 MHz corresponding to a time period of 10 Tw.

Figure 6:
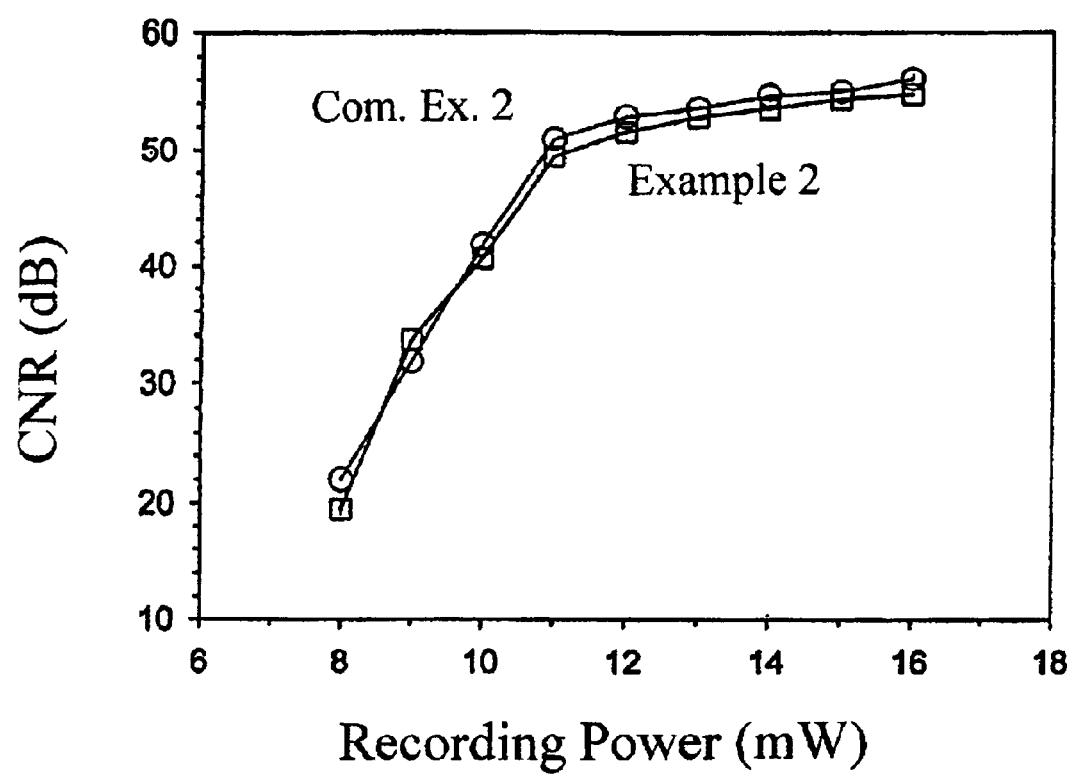
FIG. 6 presents the relationship between carrier to noise ratio (CNR) and recording power of the optical recording discs prepared in Comparative Example 2 and Example 2.
Figure 7:
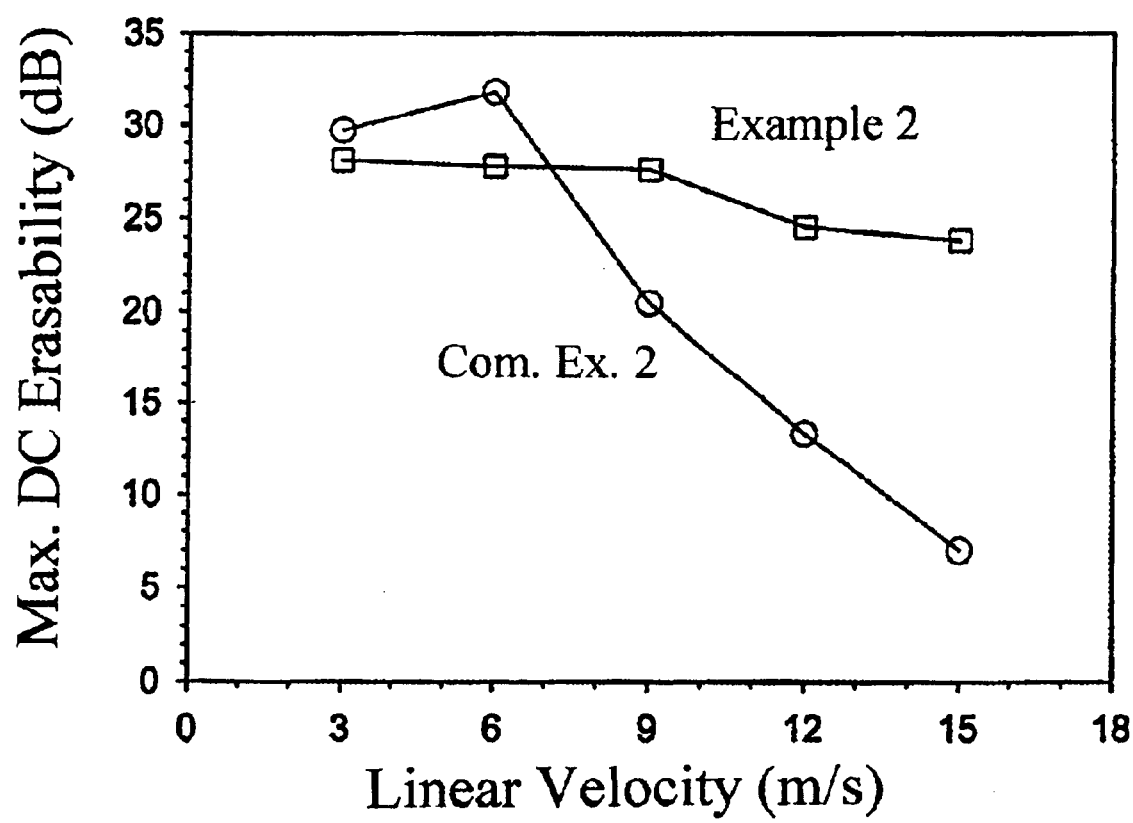
FIG. 7 shows the relationship between maximum DC erasibility and linear velocity of the optical recording discs prepared in Comparative Example 2 and Example 2.

FIG. 6 shows the observed relationship between recording power and carrier-to-noise ratio (CNR). As can be seen in FIG. 6, the CNR values of the discs of Example 2 and Comparative Example 2 are similar with only 1 to 2 dB difference regardless of a recording power. Since the contrast ratio $(R_x-R_a)/(R_x+R_a)$ of 0.57 and 0.48 observed for $Ge_1Sb_2Te_4$ and $(Sn_1Bi_2Te_4)_{0.15}(Ge_1Sb_2Te_4)_{0.85}$, accounts for 1.5 dB CNR difference, it follows that sizes of amorphous marks may be comparable between the two discs. In turn, it can be reasonably predicted that the two recording materials may have similar thermophysical constants such as specific heat, thermal conductivity and melting temperature (Since melting temperatures are 615° C. for $Ge_1Sb_2Te_4$ and 596° C. for $Sn_1Bi_2Te_4$, the difference would be even smaller between $Ge_1Sb_2Te_4$ and $(Sn_1Bi_2Te_4)_{0.15}(Ge_1Sb_2Te_4)_{0.85}$).
Erasing Properties Using the discs prepared in Example 2 and Comparative Example 2, recording was performed first at the fixed recording power of 15 mW under the aforementioned conditions otherwise. The recorded amorphous marks were subsequently DC-erased with varying erasing power somewhere in between 2 and 10 mW at a disc linear velocity ranging from 3 to 15 m/s. The reduction in Carrier Level was measured after each DC erasing and then the maximum erasability was determined at each disc linear velocity.

FIG. 6 shows the observed relationship between linear velocity and maximum DC erasability. As for the disc of Comparative Example 2, erasability decreases rapidly with linear velocity exceeding 6 m/s, reaching below 20 dB at the linear velocity of 9 m/s or higher. By contrast, the inventive disc of Example 2 exhibits no appreciable decrease with increasing linear velocity but maintains a high erasability of around 25 dB even at the linear velocity of 15 m/s.

As can be seen from the above results, the inventive optical recording material provides superior erasibilities in addition to good recording properties. Therefore, the optical recording material of the present invention may be advantageously applied to a rewritable phase-change optical recording medium with a high recording density and data transfer rate.

While the invention has been described with respect to the above specific embodiments, it should be recognized that various modifications and changes may be made to the invention by those skilled in the art which also fall within the scope of the invention as defined by the appended claims.

What is claimed is:

1. An optical recording material comprising a composition having the formula of:

$$(A_aB_bC_c)_x(Ge_aSb_bTC_c)_{1-x}$$

wherein, A is an element selected from group IVB of the periodic table; B is an element selected from the group VB of the periodic table; C is an element selected from the group VIB of the periodic table; a, b and c are atomic mole ratios; 0<x<1, x being a mole fraction; and at least one of A, B and C has a higher atomic number, and thus a smaller diatomic bond strengths than that of the corresponding element in the GeSbTe part.

2. The optical recording material of claim 1, wherein the compound is a solid solution of an ABC alloy and a GeSbTe alloy, the ABC alloy having essentially the same crystal structure as the GeSbTe alloy.

3. The optical recording material of claim 2, wherein both the ABC alloy and the GeSbTe alloy are stoichiometric compounds.

4. The optical recording material of claim 1, wherein A is an element selected from the group consisting of Ge, Sn and Pb.

5. The optical recording material of claim 1, wherein B is Bi or Sb.

6. The optical recording material of claim 1, wherein C is Te or Se.

7. The optical recording material of claim 1, wherein A is Sn, B is Bi, and C is Te.

8. The optical recording material of claim 1, wherein A is Pb, B is Bi, and C is Te.

9. The optical recording material of claim 1, wherein A is Sn, B is Bi, and C is Se.

10. The optical recording material of claim 1, wherein A is Pb, B is Bi, and C is Se.

11. The optical recording material of claim 1, wherein A is Pb, B is Sb, and C is Se.

12. The optical recording material of claim 1, wherein a is 4, b is 1, and c is 5.

13. The optical recording material of claim 1, wherein a is 2, b is 2, and c is 5.

14. The optical recording material of claim 1, wherein a is 1, b is 2, and c is 4.

15. The optical recording material of claim 1, wherein a is 1, b is 4, and c is 7.

16. The optical recording material of claim 1, wherein x is in the range of 0.01 to 0.5.

17. A rewritable phase-change optical recording medium comprising the optical recording material of claim 1.

* * * * *